(12) United States Patent
Lee et al.

(10) Patent No.: US 7,953,972 B2
(45) Date of Patent: May 31, 2011

(54) SYSTEM AND METHOD FOR MANAGING FILES

(75) Inventors: Chung-I Lee, Taipei Hsien (TW); Gang Peng, Shenzhen (CN); Kuan-Chiao Peng, Taipei Hsien (TW); Hai-Hong Lin, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 987 days.

(21) Appl. No.: 11/778,088

(22) Filed: Jul. 16, 2007

(65) Prior Publication Data

US 2008/0183771 A1    Jul. 31, 2008

(30) Foreign Application Priority Data

Jan. 26, 2007   (CN) .......................... 2007 1 0200115

(51) Int. Cl.
*H04L 29/06* (2006.01)
*H04L 9/32* (2006.01)
(52) U.S. Cl. ........ 713/165; 713/166; 713/167; 713/171; 713/185; 726/26; 726/28; 709/219; 707/690
(58) Field of Classification Search .................. None
See application file for complete search history.

(56) References Cited

U.S. PATENT DOCUMENTS

| 5,668,991 | A | 9/1997 | Dunn et al. |
| 6,393,420 | B1 * | 5/2002 | Peters ................................ 1/1 |

(Continued)

FOREIGN PATENT DOCUMENTS

CN    1466722 A    1/2004

(Continued)

OTHER PUBLICATIONS

Rui He, Total Commander, the periodical of Niu Niu Learning Computers, Dec. 31, 2005, p. 56, China Academic Journal Electronic Publishing House, China.

*Primary Examiner* — Kaveh Abrishamkar
(74) *Attorney, Agent, or Firm* — Frank R. Niranjan

(57) ABSTRACT

A computer-based method for managing files includes: configuring an access control list which illustrates all the accessible rights to corresponding users, the accessible rights comprise the right for comparing selected files, the right for merging selected files and the right for dividing a selected file; saving created files in a file transfer protocol (FTP) server, and saving file information of the files in a database, the file information including a file path of each of the files; reading from the FTP server selected files that need to be compared according to respective file paths if a files comparing request is received, comparing the selected files, and outputting differences between the selected files; reading from the FTP server selected files that need to be merged according to respective file paths if a files merging request is received, merging the selected files to create a merged file, and saving information of the merged file in the database; reading from the FTP server a selected file that needs to be divided according to a corresponding file path and a file position of the file, if a file dividing request is received, dividing the selected file into two files at the file position, and saving information of two divided files in the database. A related system is also disclosed.

8 Claims, 3 Drawing Sheets

U.S. PATENT DOCUMENTS

| | | | |
|---|---|---|---|
| 7,031,954 B1* | 4/2006 | Kirsch | 707/731 |
| 7,421,555 B2* | 9/2008 | Dorey | 711/164 |
| 7,792,300 B1* | 9/2010 | Caronni | 380/277 |
| 7,810,133 B2* | 10/2010 | Carter et al. | 726/2 |
| 2002/0188638 A1* | 12/2002 | Hamscher | 707/530 |
| 2006/0259524 A1 | 11/2006 | Horton | |
| 2006/0282483 A1 | 12/2006 | Hachio et al. | |

FOREIGN PATENT DOCUMENTS

| | | |
|---|---|---|
| CN | 1900930 A | 1/2007 |

\* cited by examiner

SYSTEM AND METHOD FOR MANAGING FILES

BACKGROUND OF THE INVENTION

1. Field of the Invention

The present invention is related to a system and method for managing files.

2. Description of Related Art

In a traditional way, a file with different versions is manually recorded separately. In this manual method, it takes a long time to look up files with different versions. It would be a hard problem to distinguish the differences between two files with different versions. In order to manage a great deal of files, there is a need to record different versions of the files effectively.

At the same time, there is a need to save a previous version of the file after each of the modifications on the file. If the previous version of the file is covered by a new revised version of the file, the previous version of the file will not be found out. So, there is a need to record the previous version of the file effectively before the previous version of the file is modified, the previous version of the file can be found out easily if it has been recorded before it is modified. What's more, there are needs to improve the efficiency to manage files such as compare the files, merge the files, and divide the files.

Therefore, what is needed is a system and method for managing files which can record the versions of the files, compare the files, merge the files, and divide the file efficiently.

SUMMARY OF THE INVENTION

A system for managing files is provided in accordance with a preferred embodiment. The system includes a computer, a file manager server, a database and a file transfer protocol (FTP) server. The file manager server is connected with the computer, the database and the FTP server. The FTP server is configured for storing files with different versions. The database is configured for storing file information that includes a file path of each of the files. The file manager server includes an access control list, a file creating module, a files comparing module, a files merging module and a file dividing module. The access control list is configured for illustrating all the accessible rights to corresponding user, wherein the accessible rights comprises the right for comparing selected files, the right for merging selected files and the right for dividing a selected file. The file creating module is configured for creating files, saving the files in the FTP server, and saving information of the files in the database. The files comparing module is configured for reading from the FTP server selected files that need to be compared according to respective file paths if a files comparing request is received, comparing the selected files, and outputting differences between the selected files. The files merging module is configured for reading from the FTP server selected files that need to be merged according to respective file paths if a files merging request is received, merging the selected files to create a merged file, and saving information of the merged file in the database. The file dividing module is configured for reading from the FTP server a selected file that needs to be divided according to a corresponding file path and a file position of the file, if a file dividing request is received, dividing the selected file into two files at the file position, and saving information of two divided files in the database.

A computer-based method for managing files is also provided. The method includes the steps of: configuring an access control list, illustrating all the accessible rights to corresponding users, wherein the accessible rights comprises the right for comparing selected files, the right for merging selected files and the right for dividing a selected file; saving created files in a file transfer protocol (FTP) server, and saving file information of the files in a database, the file information including a file path of each of the files; reading from the FTP server selected files that need to be compared according to respective file paths if a files comparing request is received, comparing the selected files, and outputting differences between the selected files; reading selected files that need to be merged from the FTP server according to respective file paths if a files merging request is received, merging the selected files to create a merged file, and saving information of the merged file in the database; reading from the FTP server a selected file that needs to be divided according to a corresponding file path and a file position of the file, if a file dividing request is received, dividing the selected file into two files at the file position, and saving information of two divided files in the database.

Other systems, methods, features, and advantages of the present invention will be or become apparent to one with skill in the art upon examination of the following drawings and detailed description.

DETAILED DESCRIPTION OF THE INVENTION

Figure 1:
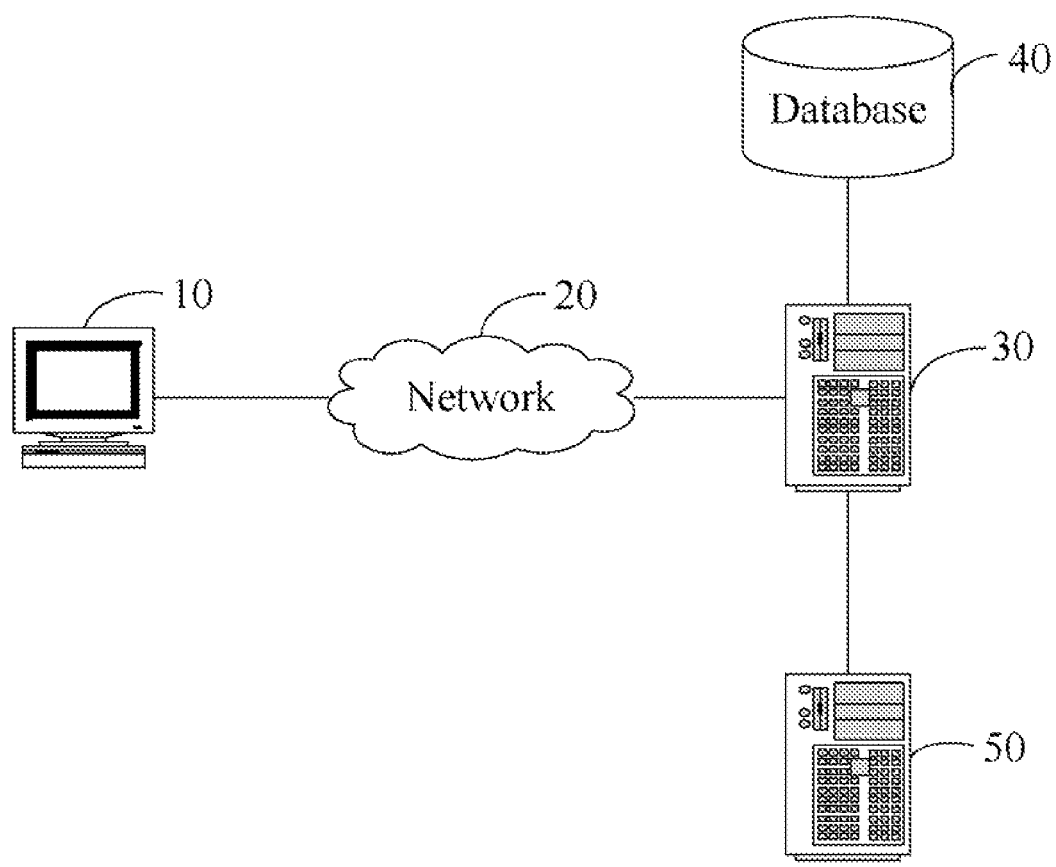
FIG. 1 is a schematic diagram of a hardware configuration of a system for managing files in accordance with a preferred embodiment.

FIG. 1 is a schematic diagram of a hardware configuration of a system for managing files (hereinafter, "the system") in accordance with a preferred embodiment. The system typically includes a computer 10, a file manager server 30, a database 40, and a file transfer protocol (FTP) server 50. The computer 10 connects to the file manager server 30 through a network 20, and the file manager server 30 connects with the database 40 and the FTP server 50. The FTP server 50 is configured for storing files. The database 40 is configured for storing information of each of the files. Each of the files may include a file identifier, a file name, a file version number, a file path, and a user-selected status of the file. Each of the files may have different versions, each of which may be represented by a file version number such as 1.0 or 2.0. The database 40 stores a unique identifier of each of the files. The file path is a location of a file stored in the FTP server 50. The user-selected status is the record of different versions of each of the files by using user-selected phrases such as "draft", "formal" and "final". The file manager server 30 may obtain a file path from the database 40, and send the file path to the computer 10 in a hyperlink format. By clicking on the hyperlink, a user can open a corresponding file from the FTP server 50 according to the file path and modify the file with the computer 10. The file manager server 30 can save the modified file in the FTP server 50, and save information of the modified file in the database 40.

The file managing server 30 stores an access control list illustrating all the accessible rights to corresponding users, wherein the accessible rights includes the right for comparing selected files, the right for merging selected files, the right for dividing a selected file, the right for encrypting selected files, the right for decrypting selected files and the right for recording logs. To set a right such as the right of comparing selected files, a variable is generally used. For example, the administrator can authorize the right of comparing selected files to a user by setting the value of the variable as "true." In other way, the right of comparing selected files may be removed by resetting the variable value from "true" to "false."

When receiving a files comparing request (i.e., the user selects two files having different version numbers to be compared), the file manager server 30 reads from the FTP server 50 the two selected files according to the file paths, compares the two selected files, and outputs differences between the two selected files on the computer 10. When receiving a files merging request (i.e., the user selects two files having different version numbers to be merged), the file manager server 30 reads from the FTP server 50 the two selected files according to the file path of each of the two selected files, merges the two selected files to create a merged file, and saves information of the merged file in the database 40. When receiving a file dividing request (i.e., the user selects a to-be-divided file and a file position), the file manager server 30 reads the selected file from the FTP server 50 according to the file path of the selected file, divides the selected file into two files at the file position, and saves information of two divided files in the database 40.

Figure 2:
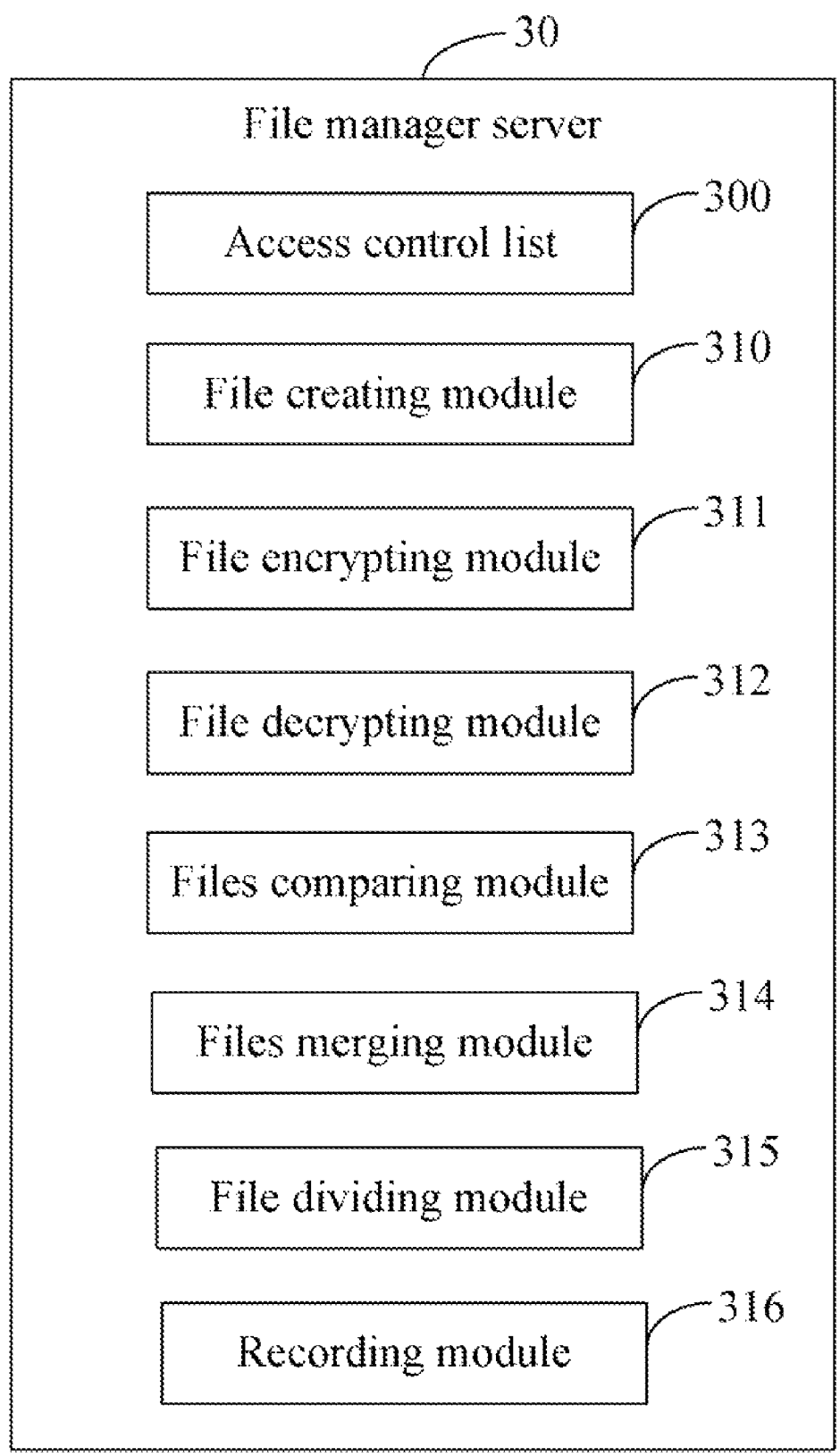
FIG. 2 is a schematic diagram showing function modules of a file manager server of the system of FIG. 1.

FIG. 2 is a schematic diagram showing function modules of the file manager server 30. The file manager server 30 may include an access control list 300, a file creating module 310, a file encrypting module 311, a file decrypting module 312, a files comparing module 313, a files merging module 314, a file dividing module 315, and a recording module 316.

The access control list 300 is configured for illustrating all the accessible rights to corresponding users, wherein the accessible rights includes the right for comparing selected files, the right for merging selected files, the right for dividing a selected file, the right for encrypting selected files, the right for decrypting selected files and the right for recording logs. The file creating module 310 is configured for creating files, and saving the files in the FTP server 50 after the file encrypting module 311 encrypts the files. The file creating module 310 also saves information of each of the files (i.e., the file identifier, the file name, the file version number, the file path, and the user-selected status) in the database 40.

When the file manager server 30 receives a files comparing request from the computer 10 (i.e., a user selects two files representing different versions of an original file, each of the two selected files having different version numbers relating to the original file), the files comparing module 313 reads the two selected files from the FTP server 50 according to the file paths if the identity of the user is valid (i.e., the user passes the verification of his or her username and password, and the access control list 300 includes the right for comparing selected files). The file decrypting module 312 decrypts the selected files if the identity of the user is valid. Then, the files comparing module 313 compares the two selected files, and outputs the differences between the two selected files. If the identity of the user is not valid (i.e., the user doesn't passes the verification of his or her username and password, or the access control list 300 does not include the user right for comparing selected files of the user), the files comparing request will not be processed.

When the file manager server 30 receives a files merging request from the computer 10 (i.e., the user selects two files having different version numbers to be merged), the files merging module 314 reads from the FTP server 50 the two selected files according to the file path of each of the two selected files if the identity of the user is valid (i.e., the user passes the verification of his or her username and password, and the access control list 300 includes the right for merging selected files). The file decrypting module 312 decrypts the selected files if the identity of the user is valid. Then, the files merging module 314 merges the two selected files to create a merged file, and saves the information of the merged file (i.e., the file identifier, the file name, the file version number, the file path, and the user-selected status) in the database 40. If the identity of the user is not valid (i.e., the user doesn't passes the verification of his or her username and password, or the access control list 300 does not include the user right for merging selected files of the user), the files merging request will not be processed.

When the file manager server 30 receives a file dividing request from the computer 10 (i.e., the user selects a file to be divided and a file position for the file dividing), the file dividing module 315 reads from the FTP server 50 the selected file according to the file path of the selected file if the identity of the user is valid (i.e., the user passes the verification of his or her username and password, and the access control list 300 includes the right for dividing a selected file). The file decrypting module 312 decrypts the selected file if the identity of the user is valid. Then, the file dividing module 315 divides the selected file into two files at the file position, and saves information of the two divided files (i.e., the file identifier, the file name, the file version number, the file path, and the user-selected status) in the database 40. If the identity of the user is not valid (i.e., the user doesn't passes the verification of his or her username and password, or the access control list 300 does not include the user right for dividing a selected file of the user), the file dividing request will not be processed.

The recording module 316 is configured for recording errors in process of the files comparing, the files merging, and the file dividing, wherein the errors include the alarming message that the user has no accessible right to do a corresponding file process such as the files comparing.

Figure 3:
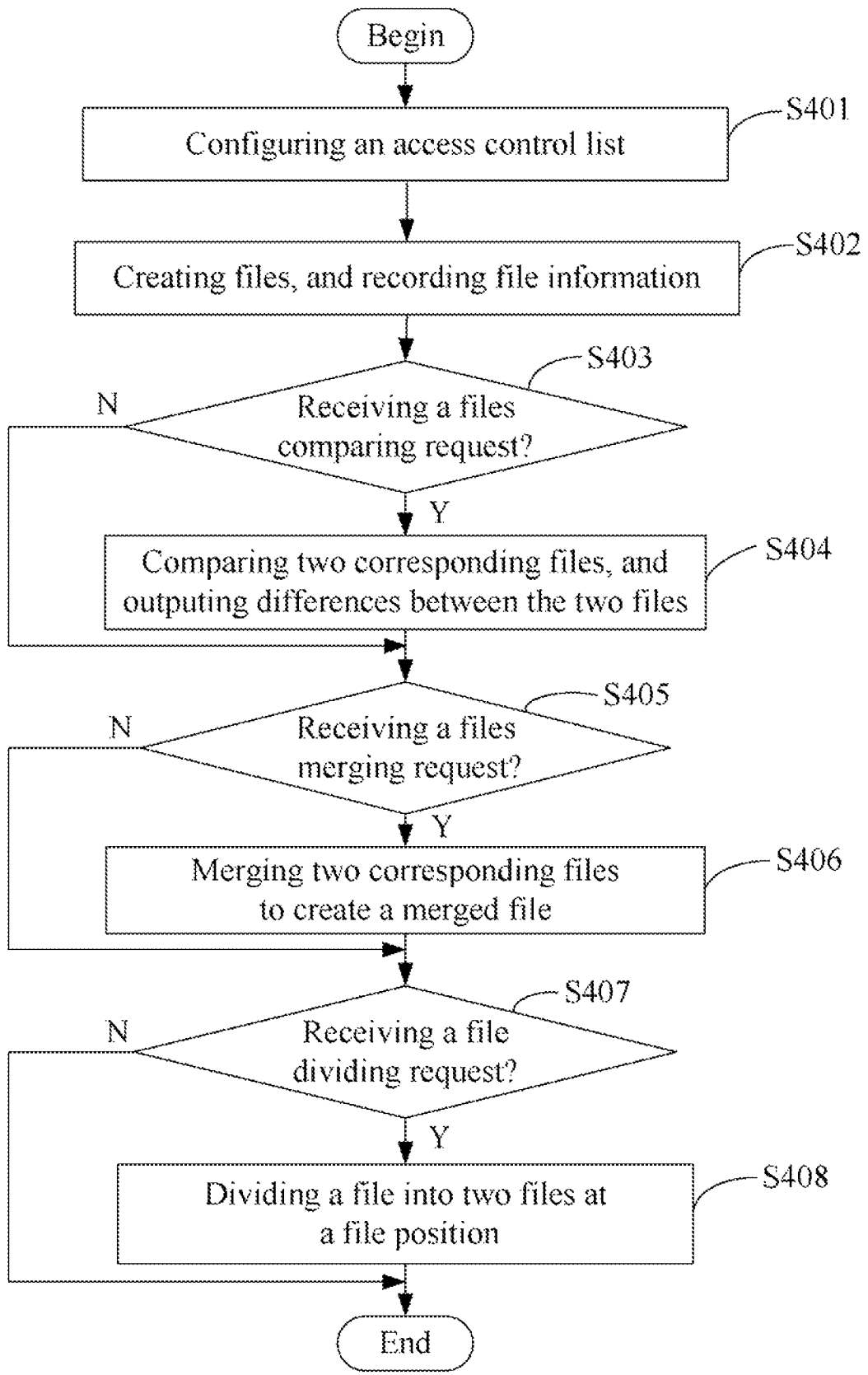
FIG. 3 is a flowchart of a preferred method for managing files in accordance with one embodiment.

FIG. 3 is a flowchart of a preferred method for managing files in accordance with one embodiment. In step S401, an administrator sets the access control list 300 for illustrating all the accessible rights to corresponding users, wherein the accessible rights includes the right for comparing selected files, the right for merging selected files, the right for dividing a selected file, the right for encrypting selected files, the right for decrypting selected files and the right for recording logs.

In step S402, a user creates files to be managed through the file creating module 310. The file creating file 310 saves the files in the FTP server 50 after the file encrypting module 311 encrypts the files, and saves information of each of the files (i.e., the file identifier, the file name, the file version number, the file path, and the user-selected status) in the database 40.

In step S403, the file manager server 30 judges whether a files comparing request is received from the computer 10. If no files comparing request is received, the procedure goes to step S405 described below.

When the file manager server 30 receives the files comparing request (i.e., a user selects two files representing different versions of an original file, each of the two selected files having different version numbers relating to the original file), in step S404, the files comparing module 313 reads from the FTP server 50 the two selected files according to the file paths if the identity of the user is valid (i.e., the user passes the verification of his or her username and password, and the access control list 300 includes the right for comparing selected files). The file decrypting module 312 decrypts the two selected files if the identity of the user is valid. Subsequently, the files comparing module 313 compares the two selected files, and outputs the differences between the two selected files. If the identity of the user is not valid (i.e., the user doesn't passes the verification of his or her username and password, or the access control list 300 does not include the user right for comparing selected files of the user), the files comparing request will not be processed, and the recording module 316 records an error message, wherein the error message shows that the user does not have the right to do the files comparing.

In step S405, the file manager server 30 judges whether a files merging request is received from the computer 10. If no files merging request is received, the procedure goes to step S407 described blow.

When the file manager server 30 receives the files merging request (i.e., the user selects two files having different version numbers to be merged), in step S406, the files merging module 314 reads from the FTP server 50 the two selected files according to the file path of each of the two selected files if the identity of the user is valid (i.e., the user passes the verification of his or her username and password, and the access control list 300 includes the right for merging selected files). The file decrypting module 312 decrypts the two selected files if the identity of the user is valid. Subsequently, the files merging module 314 merges the two selected files to create a merged file, and saves the information of the merged file (i.e., the file identifier, the file name, the file version number, the file path, and the user-selected status) in the database 40. If the identity of the user is not valid (i.e., the user doesn't passes the verification of his or her username and password, or the access control list 300 does not illustrate that the user have the right for merging selected files), the files merging request will not be processed, and the recording module 316 records an error message, wherein the error message shows that the user does not have the right to do the files merging.

In step S407, the file manager server 30 judges whether a file dividing request is received from the computer 10. If no file dividing request is received, the procedure ends.

When the file manager server 30 receives the file dividing request (i.e., the user selects a file to be divided and a file position for the file dividing), in step S408, the file dividing module 315 reads from the FTP server 50 the selected file according to the file path of the selected file if the identity of the user is valid (i.e., the user passes the verification of his or her username and password, and the access control list 300 includes the right for dividing a selected file). The file decrypting module 312 decrypts the selected file if the identity of the user is valid. Subsequently, the file dividing module 315 divides the selected into two files at the file position, and saves information of the two divided files (i.e., the file identifier, the file name, the file version number, the file path, and the user-selected status) in the database 40. If the identity of the user is not valid (i.e., the user doesn't passes the verification of his or her username and password, or the access control list 300 does not include the user right for dividing a selected file of the user), the file dividing request will not be processed, and the recording module 316 records an error message, wherein the error message shows that the user does not have the right to do the files dividing.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system for managing files, the system comprising a computer, a file manager server, a database, and a file transfer protocol (FTP) server, the file manager server being connected with the computer, the database, and the FTP server, and being configured for storing different versions of electronic information stored in each of the files, the database being configured for storing file information that comprises a file path of each of the files and a user-selected status of each of the files, the file manager server obtaining a file path from the database according to the user-selected status of the file, and send the file path to the computer in a hyperlink format, the file manager server comprising:

an access control list illustrating all the accessible rights to corresponding users, wherein the accessible rights comprises the right for encrypting selected files, the right for decrypting selected files, the right for comparing selected files, the right for merging selected files and the right for dividing a selected file, and a variable being used to set a corresponding right to a user;

a file creating module configured for creating files, saving the files in the FTP server after a file encrypting module encrypts the files, and saving information of the files in the database;

a files comparing module configured for reading from the FTP server selected files that need to be compared according to respective file paths if a files comparing request is received and the identity of the user is valid, comparing the selected files after the selected files being decrypted by a file decrypting module if the identity of the user is valid, and outputting differences between the selected files;

a files merging module configured for reading from the FTP server selected files that need to be merged according to respective file paths if a files merging request is received and the identity of the user is valid, merging the selected files to create a merged file after the selected files being decrypted by the file decrypting module if the identity of the user is valid, and saving information of the merged file in the database; and a file dividing module configured for reading from the FTP server a selected file that needs to be divided according to a corresponding file path and a file position of the file, if a file dividing request is received and the identity of the user is valid, dividing the selected file into two files at the file position after the selected file being decrypted by the file decrypting module if the identity of the user is valid, and saving information of two divided files in the database; and at least one processor for executing the file encrypting module, the file decrypting module, the file creating module, the files comparing module, the files merging module, and the file dividing module.

2. The system according to claim 1, wherein the file information further comprises a file identifier, a file name, and a file version number.

3. The system according to claim 1, wherein the accessible rights further comprise the right for recording logs.

4. The system according to claim 3, wherein the file manager server further comprises:

a recording module configured for recording error message generated during processing of the files comparing, the file merging, and the file dividing, wherein the error message illustrates that the user has no accessible right to do a corresponding file process.

5. A computer-based method for managing files, the method comprising:

configuring an access control list, illustrating all the accessible rights to corresponding users, wherein the accessible rights comprises the right for encrypting selected files, the right for decrypting selected files, the right for comparing selected files, the right for merging selected files and the right for dividing a selected file, and a variable being used to set a corresponding right to a user;

saving created files in a file transfer protocol (FTP) server after the files being encrypted, and saving file information of the files in a database, the file information including a file path of each of the files and a user-selected status of each of the files, the file manager server obtaining a file path from the database according to the user-selected status of the file, and send the file path to the computer in a hyperlink format;

reading from the FTP server selected files that need to be compared according to respective file paths if a files comparing request is received and the identity of the user is valid, comparing the selected files after the selected files being decrypted if the identity of the user is valid, and outputting differences between the selected files;

reading from the FTP server selected files that need to be merged according to respective file paths if a files merging request is received and the identity of the user is valid, merging the selected files to create a merged file after the selected files being decrypted if the identity of the user is valid, and saving information of the merged file in the database; and reading from the FTP server a selected file that needs to be divided according to a corresponding file path and a file position of the file, if a file dividing request is received and the identity of the user is valid, dividing the selected file into two files at the file position after the selected file being decrypted if the identity of the user is valid, and saving information of two divided files in the database; and at least one processor for executing the aforementioned steps.

6. The method according to claim 5, wherein the file information further includes a file identifier, a file name, and a file version number.

7. The method according to claim 5, wherein the accessible rights further comprise the right for recording logs.

8. The method according to claim 7, further comprising:

recording error message during processing of the files comparing, the file merging, and the file dividing, wherein the error message illustrates that the user has no accessible right to do a corresponding file process.

* * * * *